US012693563B2

(12) United States Patent
Wu et al.

(10) Patent No.: US 12,693,563 B2
(45) Date of Patent: Jul. 28, 2026

(54) DISPLAY DEVICE

(71) Applicant: AUO Corporation, Hsinchu City (TW)

(72) Inventors: Chia-Jung Wu, Hsinchu City (TW);
Yueh-Chi Wu, Hsinchu City (TW);
Ti-Kuei Yu, Hsinchu City (TW);
Ya-Ling Hsu, Hsinchu City (TW)

(73) Assignee: AUO CORPORATION, Hsinchu City
(TW)

( * ) Notice: Subject to any disclaimer, the term of this
patent is extended or adjusted under 35
U.S.C. 154(b) by 0 days.

(21) Appl. No.: 18/926,349

(22) Filed: Oct. 25, 2024

(65) Prior Publication Data

US 2025/0306419 A1      Oct. 2, 2025

(30) Foreign Application Priority Data

Mar. 28, 2024    (TW) ................................... 113111886

(51) Int. Cl.
*G02F 1/1335*        (2006.01)
*G02F 1/1333*        (2006.01)
(52) U.S. Cl.
CPC .... *G02F 1/133612* (2021.01); *G02F 1/13336*
(2013.01)
(58) Field of Classification Search
CPC ................. H10K 77/10; H10K 77/111; H10K
2102/311; H10K 59/18; G09G 3/3233;
G02F 1/133305
See application file for complete search history.

(56) References Cited

U.S. PATENT DOCUMENTS

2018/0173036 A1*   6/2018   Kim .................. G02F 1/133524
2021/0408169 A1*  12/2021   Wang ................ G02F 1/133331

FOREIGN PATENT DOCUMENTS

CN        104751747 A     7/2015
CN        114913779 A     8/2022
CN        115273676 A    11/2022
CN        116741056 A     9/2023

* cited by examiner

*Primary Examiner* — Kevin M Nguyen
(74) *Attorney, Agent, or Firm* — WPAT, PC

(57)            ABSTRACT

A display device includes a backlight module and a first
circuit substrate. The first circuit substrate has a central
portion and a first extending portion. The central portion has
a first pixel area having first pixel units and a second pixel
area having second pixel units. The second pixel units
collectively surround the first pixel units. The first extending
portion includes a first bending portion and a second bend-
ing portion. The first bending portion is connected to a first
side of the central portion and configured to be bent to a side
surface of the backlight module. The second bending portion
is connected to the central portion through the first bending
portion and configured to be bent below the backlight
module. The second bending portion has a first gate on array
communicatively connected to one of the first pixel units
and the second pixel units.

19 Claims, 16 Drawing Sheets

DISPLAY DEVICE

CROSS-REFERENCE TO RELATED APPLICATION

This application claims priority to Taiwan Application Serial Number 113111886, filed Mar. 28, 2024, which is herein incorporated by reference.

BACKGROUND

Technical Field

The present disclosure relates to a display device. More particularly, the present disclosure relates to a large-sized seamless tiling display device.

Description of Related Art

In recent years, the demand for tiling display devices has grown as people seek larger display devices and more immersive experiences. However, when multiple display panels are tiled together, the frame widths of the display panels often cause discontinuities in the displayed image at the interfaces between adjacent display panels.

Accordingly, how to provide a display device to solve the aforementioned problems becomes an important issue to be solved by those in the industry.

SUMMARY

An aspect of the disclosure is to provide a display device that may efficiently solve the aforementioned problems.

According to an embodiment of the disclosure, a display device includes a backlight module and a first circuit substrate. The first circuit substrate has a central portion and a first extending portion. The central portion has a first pixel area and a second pixel area above the backlight module. The first pixel area has a plurality of first pixel units. The second pixel area has a plurality of second pixel units. The second pixel units collectively surround the first pixel units. The first extending portion includes a first bending portion and a second bending portion. The first bending portion is connected to a first side of the central portion. The first bending portion is configured to be bent to a side surface of the backlight module. The second bending portion is connected to the central portion through the first bending portion. The second bending portion is configured to be bent below the backlight module. The second bending portion has a first gate on array. The first gate on array is communicatively connected to at least one of the first pixel units and the second pixel units.

In an embodiment of the disclosure, the second pixel units of the second pixel area are at least partially between the first extending portion and the first pixel area.

In an embodiment of the disclosure, the first pixel units and the second pixel units are electrically connected to the first circuit substrate.

In an embodiment of the disclosure, one of the second pixel units is at least partially on the first bending portion.

In an embodiment of the disclosure, the first gate on array extends from the second bending portion to the first bending portion.

In an embodiment of the disclosure, some of the first pixel units and some of the second pixel units are communicatively connected to the first gate on array.

In an embodiment of the disclosure, the first circuit substrate has a second gate on array on the first bending portion. Some of the first pixel units are communicatively connected to the second gate on array. Some of the second pixel units are communicatively connected to the first gate on array.

In an embodiment of the disclosure, the first circuit substrate has a first chip on film. Some of the first pixel units and some of the second pixel units are communicatively connected to the first chip on film.

In an embodiment of the disclosure, the first circuit substrate further has a second extending portion connected to a second side of the central portion that is different from the first side. The first chip on film is on the second extending portion.

In an embodiment of the disclosure, the first circuit substrate further has a first chip on film and a second chip on film. Some of the first pixel units are communicatively connected to the first chip on film. Some of the second pixel units are communicatively connected to the second chip on film.

In an embodiment of the disclosure, the first circuit substrate further has a second extending portion connected to a second side of the central portion that is different from the first side. The first chip on film and the second chip on film are on the second extending portion.

In an embodiment of the disclosure, the first circuit substrate further has a second extending portion and a third extending portion connected to opposite sides of the central portion that are different from the first side, respectively. The first chip on film is on the second extending portion. The second chip on film is on the third extending portion.

In an embodiment of the disclosure, the display device further includes a second circuit substrate. The second circuit substrate has a central portion and a first extending portion connected to a first side of the central portion of the second circuit substrate. The first extending portion of the first circuit substrate is at a second side of the second circuit substrate that is different from the first side of the second circuit substrate. The first extending portion of the first circuit substrate is adjacent to the central portion of the second circuit substrate.

In an embodiment of the disclosure, the display device further includes a glass substrate. The glass substrate is between the first circuit substrate and the backlight module.

In an embodiment of the disclosure, the display device further includes a color filter and a polarizer. The color filter and the polarizer extend from above the central portion of the first circuit substrate to a side of the first extending portion of the first circuit substrate that is away from the backlight module.

According to another embodiment of the disclosure, a display device includes a driving circuit board, a backlight module, and a first circuit substrate. The backlight module is above the driving circuit board. The first circuit substrate has a central portion and a first extending portion. The central portion has a first pixel area and a second pixel area above the backlight module. The first pixel area has a plurality of first pixel units. The second pixel area has a plurality of second pixel units. The second pixel units collectively surround the first pixel units. The first extending portion includes a first bending portion and a second bending portion. The first bending portion is connected to the central portion and extends from the central portion to a side surface of the backlight module. The second bending portion is connected to the central portion through the first bending portion and extends from the first bending portion to the driving circuit board. At least one of the first pixel units and the second pixel units is communicatively connected to the driving circuit board through the first extending portion.

In an embodiment of the disclosure, the first circuit substrate further includes a first gate on array and a flexible circuit board on the second bending portion. The at least one of the first pixel units and the second pixel units is communicatively connected to the first gate on array. The first gate on array is communicatively connected to the driving circuit board through the flexible circuit board.

In an embodiment of the disclosure, some of the first pixel units and some of the second pixel units are communicatively connected to the first gate on array.

In an embodiment of the disclosure, the first circuit substrate has a second gate on array on the first bending portion and communicatively connected to the driving circuit board through the flexible circuit board. Some of the first pixel units are communicatively connected to the second gate on array. Some of the second pixel units are communicatively connected to the first gate on array.

In an embodiment of the disclosure, the first circuit substrate has a chip on film. Some of the first pixel units and some of the second pixel units are communicatively connected to the chip on film.

Accordingly, in the display device of some embodiments of the present disclosure, by disposing a bendable extending portion on the circuit substrate for tiling, the circuit for the pixel area can be bent to the side surface of the backlight module or below the backlight module, thereby increasing the wiring space for the pixel area. In addition, by disposing a second pixel area (e.g., a light-emitting diode pixel area) in the sealant layer around the first pixel area (e.g., a liquid crystal pixel area) of the circuit substrate, light-emitting units are disposed at the adjacencies between the circuit substrates tiled together, thereby eliminating the image discontinuity at the adjacencies. Moreover, with increased wiring space, a gate on array can be used to replace the traditional gate driver, and liquid crystal units and light-emitting diodes can thus be integrated on the same circuit substrate. In turn, large-sized seamless tiling display may be achieved while manufacturing costs are reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
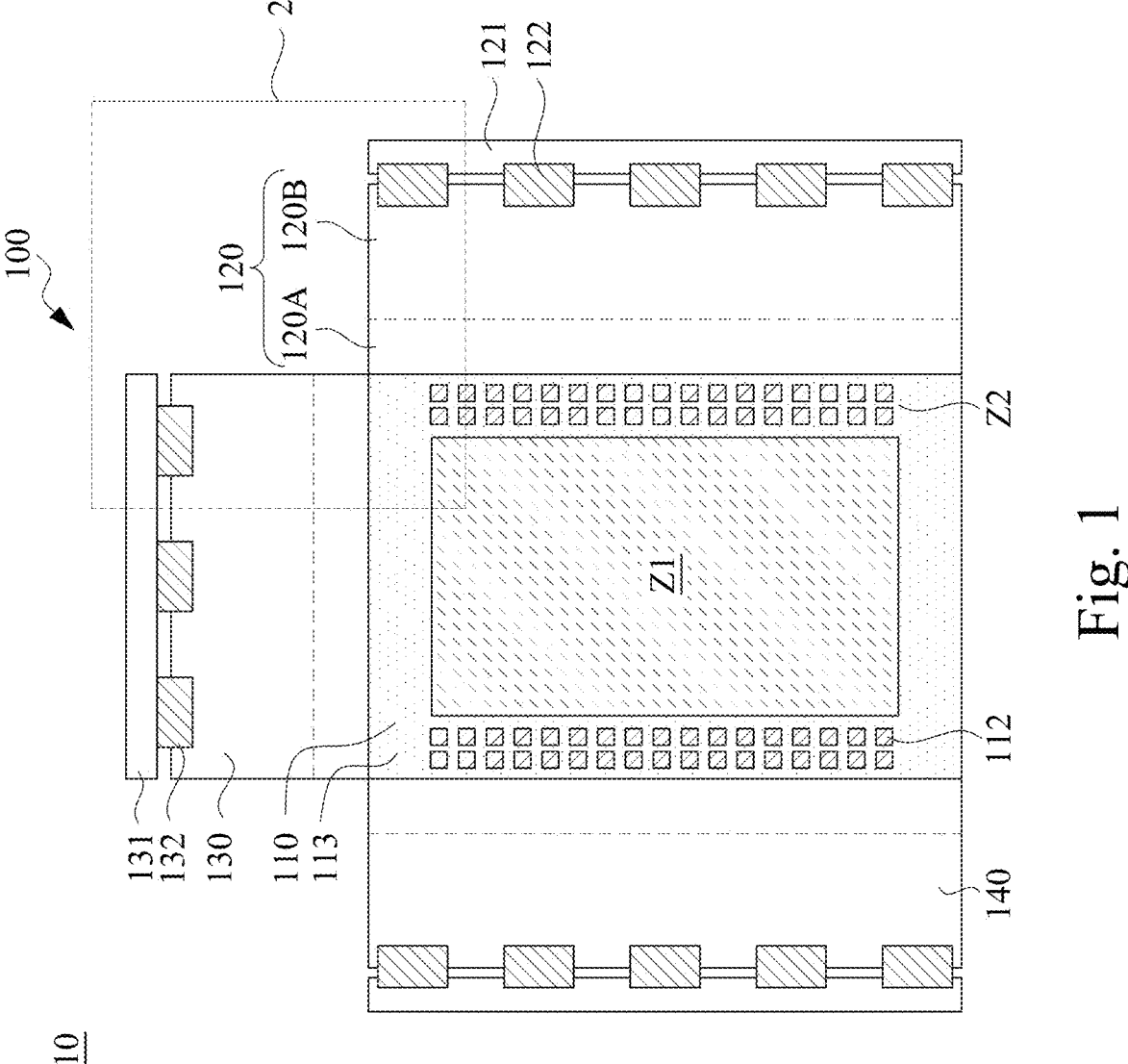
FIG. 1 is a schematic diagram of a display device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a display device 10 according to some embodiments of the present disclosure. The display device 10 includes a first circuit substrate 100. In some embodiments, the first circuit substrate 100 is a flexible substrate. The first circuit substrate 100 has a central portion 110, a first extending portion 120, a second extending portion 130, and a third extending portion 140.

The central portion 110 has a first pixel area Z1 and a second pixel area Z2. The first pixel area Z1 has a plurality of first pixel units (as shown by the first pixel units 111 in FIG. 2). The second pixel area Z2 has a plurality of second pixel units 112. In some embodiments, the first pixel area Z1 is a liquid crystal pixel area, and the second pixel area Z2 is a light-emitting diode (LED) pixel area. In some embodiments, the second pixel units 112 of the second pixel area Z2 collectively surround the first pixel units 111 of the first pixel area Z1. For example, as shown in FIG. 1, the second pixel units 112 are distributed at two opposite sides of the first pixel area Z1. In some embodiments, the second pixel units 112 of the second pixel area Z2 are at least partially between the first extending portion 120 and the first pixel area Z1. The first pixel units 111 and the second pixel units 112 are electrically connected to the first circuit substrate 100.

In addition, in some embodiments, a sealant layer is disposed on the central portion 110. As shown in FIG. 1, the sealant layer 113 completely surrounds the first pixel area Z1 and covers the second pixel area Z2. In other words, the second pixel units 112 are disposed on the first circuit substrate 100 and in the sealant layer 113. When several circuit substrates similar to the first circuit substrate 100 are tiled, the sealant layers of the circuit substrates similar to the sealant layer 113 form the borders where the circuit substrates meet.

As shown in FIG. 1, the first extending portion 120 is connected to a first side (e.g., the right side) of the central portion 110. The second extending portion 130 is connected to a second side (e.g., the upper side) of the central portion 110. The third extending portion 140 is connected to a third side (e.g., the left side) of the central portion 110. To be more specific, the first extending portion 120 and the third extending portion 140 are on two opposite sides of the central portion 110. The circuit configurations of the first extending portion 120 and the third extending portion 140 are symmetrical.

As shown in FIG. 1, each of the extending portions includes two bending portions. Take the first extending portion 120 as an example. The first extending portion 120 includes a first bending portion 120A and a second bending portion 120B, as the two sections partitioned by a dotted line in FIG. 1. The first bending portion 120A is connected to the first side of the central portion 110. The second bending portion 120B is connected to the central portion 110 through the first bending portion 120A. In some embodiments, one or more stitching lines are disposed at the dotted line to facilitate bending.

Meanwhile, the second bending portion of each of the extending portions is adjacent to and connected to a driving circuit board. For example, as shown in FIG. 1, a side of the first extending portion 120 that is away from the central portion 110 is adjacent to a driving circuit board 121, and a side of the second extending portion 130 that is away from the central portion 110 is adjacent to a driving circuit board 131. The detailed circuit configurations will be described in subsequent paragraphs.

Figure 2:
FIG. 2 is a partial enlarged view of a display device in a square 2 of FIG. 1 according to some embodiments of the present disclosure.

Reference is made to FIG. 2. FIG. 2 is a partial enlarged view of the display device 10 in a square 2 of FIG. 1. The second pixel units 112 are at the right side of the first pixel units 111 and adjacent to the first bending portion 120A. A plurality of gate on arrays 123 are disposed on the second bending portion 120B. Each of the gate on arrays 123 is communicatively connected to some of the first pixel units 111 and the second pixel units 112 through a gate signal line GL to provide pixel unit gate driving signals. The gate on arrays 123 are communicatively connected to the driving circuit board 121 through a plurality of flexible circuit boards 122. In some embodiments, the flexible circuit boards 122 are on a side of the second bending portion 120B that is away from the first bending portion 120A.

As shown in FIG. 1 and FIG. 2, a plurality of chip on films 132 (COF) are on the second extending portion 130. The chip on films 132 are on a side of the second extending portion 130 that is away from the central portion 110 and are communicatively connected to the driving circuit board 131. Each of the chip on films 132 is communicatively connected to some of the first pixel units 111 and the second pixel units 112 through a plurality of data lines DL to provide pixel unit source driving signals. In some embodiments, the first pixel units 111 and the second pixel units 112 are communicatively connected to the chip on films 132 through different data lines DL, respectively. In other words, the source driving signals of the first pixel units 111 and the source driving signals of the second pixel units 112 are not shared.

Figure 3:
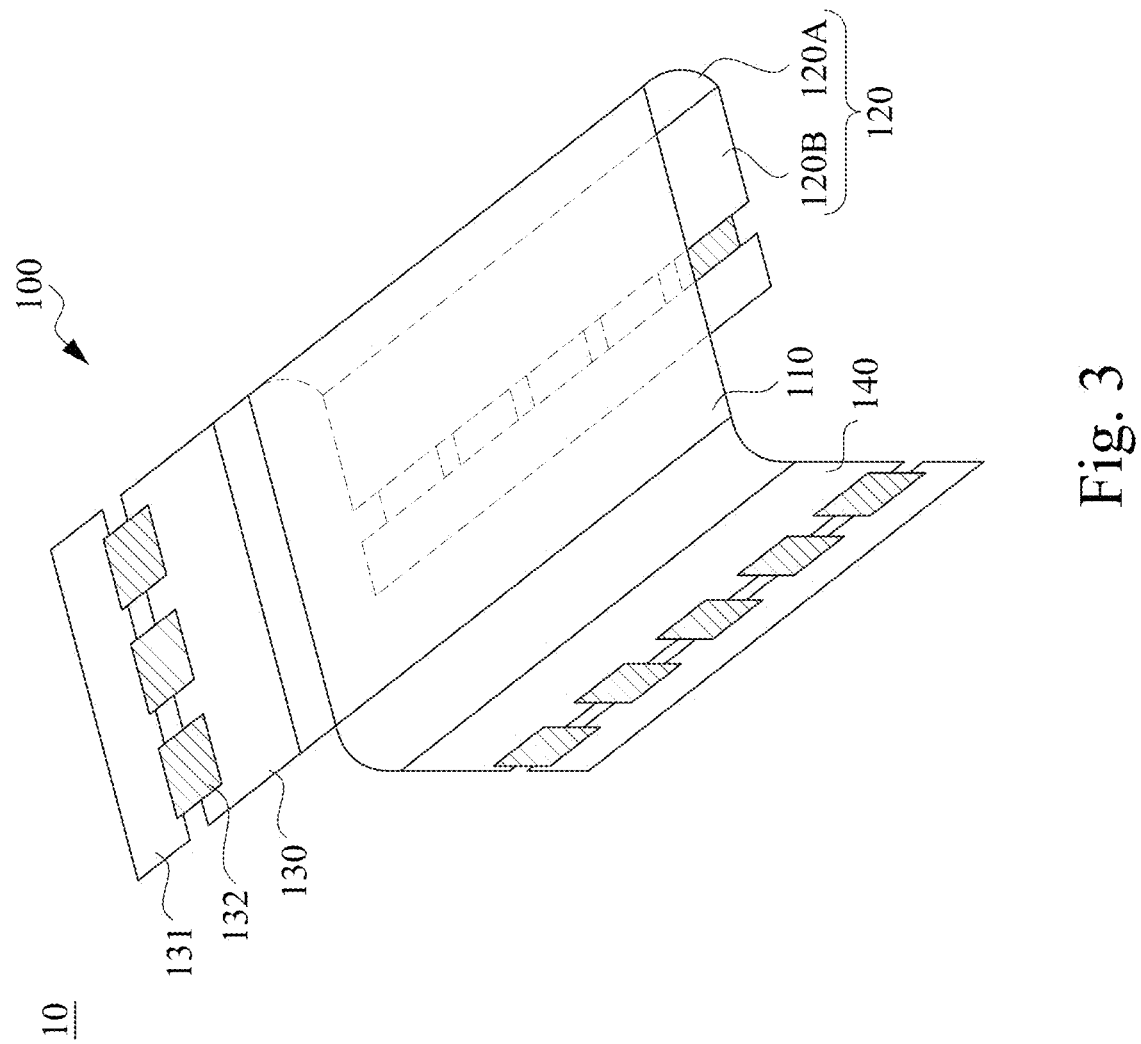
FIG. 3 is a schematic diagram of a display device according to some embodiments of the present disclosure.

Reference is made to FIG. 3. FIG. 3 is a schematic diagram of the display device 10 according to some embodiments of the present disclosure. As aforementioned, each of the extending portions of the first circuit substrate 100 has a first bending portion and a second bending portion. As shown in FIG. 3, the second bending portion 120B of the first extending portion 120 is configured to be bent below the central portion 110 and substantially parallel to the central portion 110, while the first bending portion 120A of the first extending portion 120 is substantially perpendicularly connected to the central portion 110 and the second bending portion 120B. In contrast, the second extending portion 130 is shown in a state of not yet being bent, and the third extending portion 140 is shown in a state of only bending the first bending portion.

Figure 4:
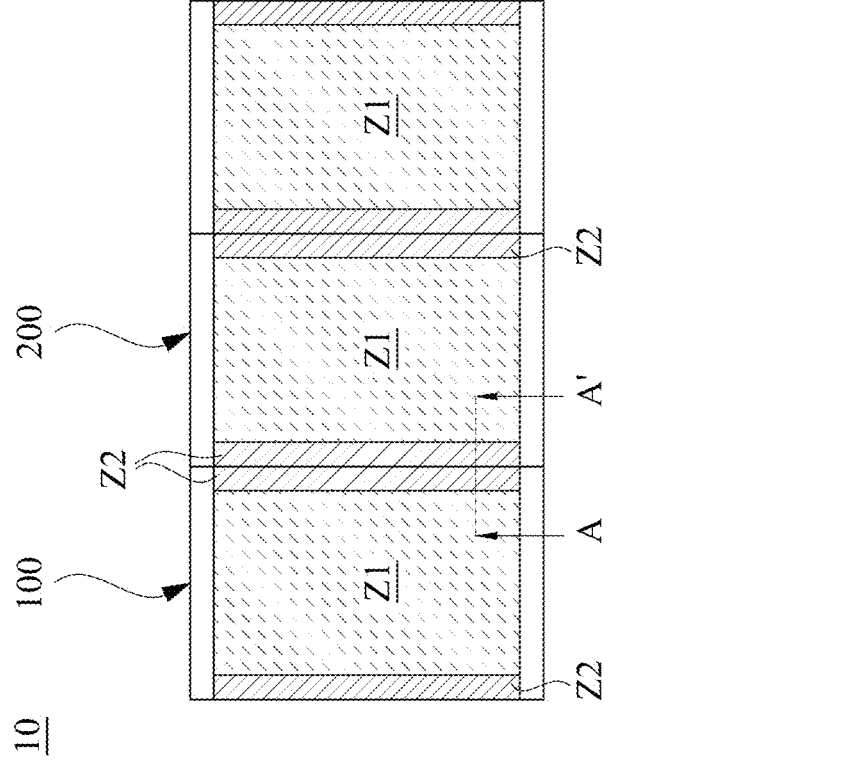
FIG. 4 is a schematic diagram of a display device according to some embodiments of the present disclosure.

Reference is made to FIG. 4. FIG. 4 is a schematic diagram of the display device 10 according to some embodiments of the present disclosure. In some embodiments, the display device 10 has multiple circuit substrates with similar structures. As shown in FIG. 4, the first circuit substrate 100 and a second circuit substrate 200 of the display device 10 are tiled adjacent to each other. In greater detail, the second pixel area Z2 of the first circuit substrate 100 is adjacent to a second pixel area Z2 of the second circuit substrate 200. In this way, the second pixel units such as light-emitting diodes are disposed in the transition area between the first pixel area Z1 of the first circuit substrate 100 and a first pixel area Z1 of the second circuit substrate 200 (for example, the area where the sealant layers are disposed) as an extension of the display area to achieve a seamless visual effect. The upper and lower sides of the circuit substrate remain a narrow bezel design. More particularly, since the second pixel area Z2 of each of the circuit substrates is disposed on two opposite sides of the first pixel area Z1, the display device 10 can achieve a 1×N large-sized seamless display. For example, FIG. 4 illustrates a 1×3 seamless display.

Figure 5:
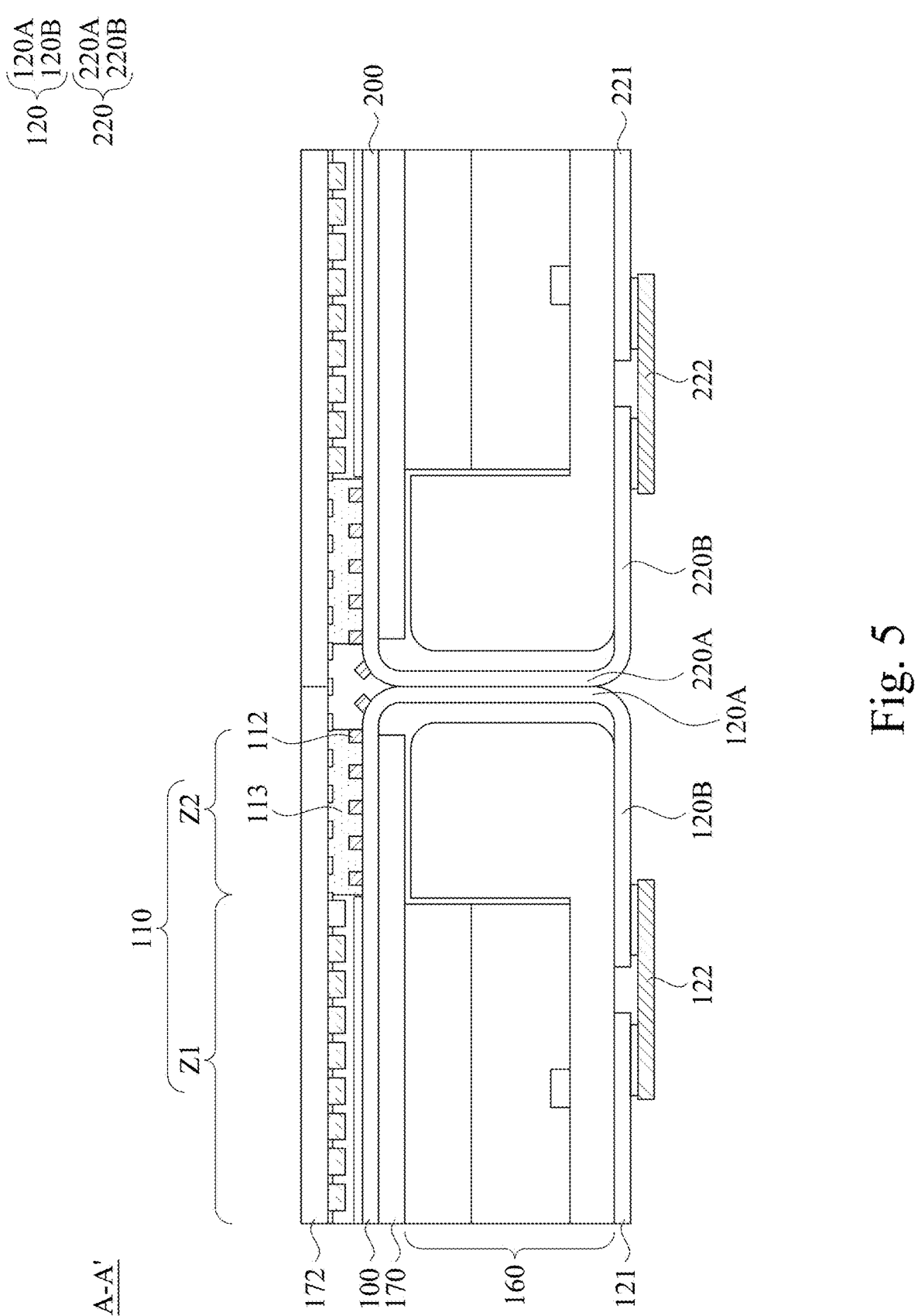
FIG. 5 is a partial cross-sectional view of a display device along a line A-A' of FIG. 4 according to some embodiments of the present disclosure.

Reference is made to FIG. 5. FIG. 5 is a partial cross-sectional view of the display device 10 along a line A-A' in FIG. 4. The first extending portion 120 of the first circuit substrate 100 is adjacent to a first extending portion 220 of the second circuit substrate 200. Similarly, the first extending portion 220 of the second circuit substrate 200 is communicatively connected to a driving circuit board 221 through a flexible circuit board 222.

Furthermore, the first bending portion 120A of the first circuit substrate 100 extends parallel to the first bending portion 220A of the second circuit substrate 200. The second bending portion 120B of the first circuit substrate 100 and the second bending portion 220B of the second circuit substrate 200 extend in opposite directions.

It should be noted that in some embodiments, in a cross-sectional view, one of the second pixel units on the first circuit substrate 100 and one of the second pixel units on the second circuit substrate 200 are disposed at least partially on the first bending portion 120A of the first circuit substrate 100 and the first bending portion 220A of the second circuit substrate 200, respectively. In other words, in a top view, a row of the second pixel units on the first circuit substrate 100 is disposed partially on the first bending portion 120A, and a row of the second pixel units on the second circuit substrate 200 is disposed partially on the first bending portion 220A. As such, the optical effect of the adjacency between the first circuit substrate 100 and the second circuit substrate 200 may be further improved, making the displayed image continuous and realistic. The second pixel units disposed partially on the first bending portions are tilted relative to the second pixel units on the central portions (such as the second pixel units 112) and are not covered by the sealant layers (such as the sealant layer 113).

In addition, the display device 10 further includes a backlight module 160, a glass substrate 170, and a color filter 172 corresponding to the first circuit substrate 100. As shown in FIG. 5, the central portion 110 of the first circuit substrate 100 is above the backlight module 160. The first bending portion 120A is bent to a side surface of the backlight module 160. The second bending portion 120B is bent below the backlight module 160. As a result, the driving circuit board 121 and the flexible circuit board 122 are below the backlight module 160. The glass substrate 170 is between the backlight module 160 and the central portion 110 of the first circuit substrate 100 to help maintain the first circuit substrate 100 in a bent state. In some embodiments, the color filter 172 may include a glass cover and be above the first circuit substrate 100. As such, the glass substrate 170 may be omitted.

Figure 6:
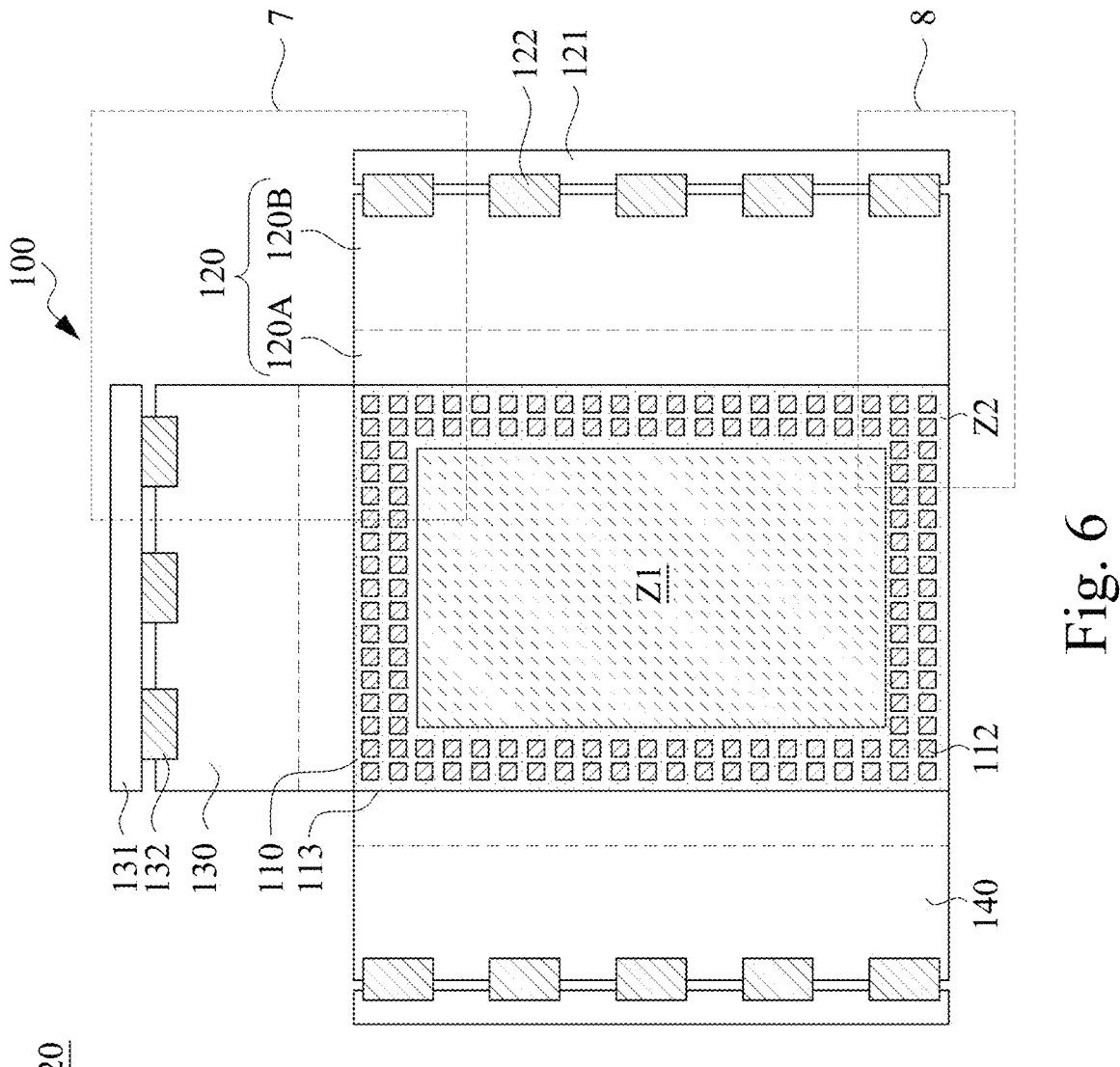
FIG. 6 is a schematic diagram of a display device according to some embodiments of the present disclosure.

Reference is made to FIG. 6. FIG. 6 is a schematic diagram of a display device 20 according to some embodiments of the present disclosure. One of the differences between the display device 20 and the display device 10 is that the second pixel area Z2 of the display device 20 further extends between the first pixel area Z1 and the second extending portion 130 and extends to a side of the first pixel area Z1 that is away from the second extending portion 130. In other words, the second pixel area Z2 completely surrounds the first pixel area Z1.

Figure 7:
FIG. 7 and FIG. 8 are partial enlarged views of a display device in a square 7 and a square 8 of FIG. 6 according to some embodiments of the present disclosure.
Figure 8:
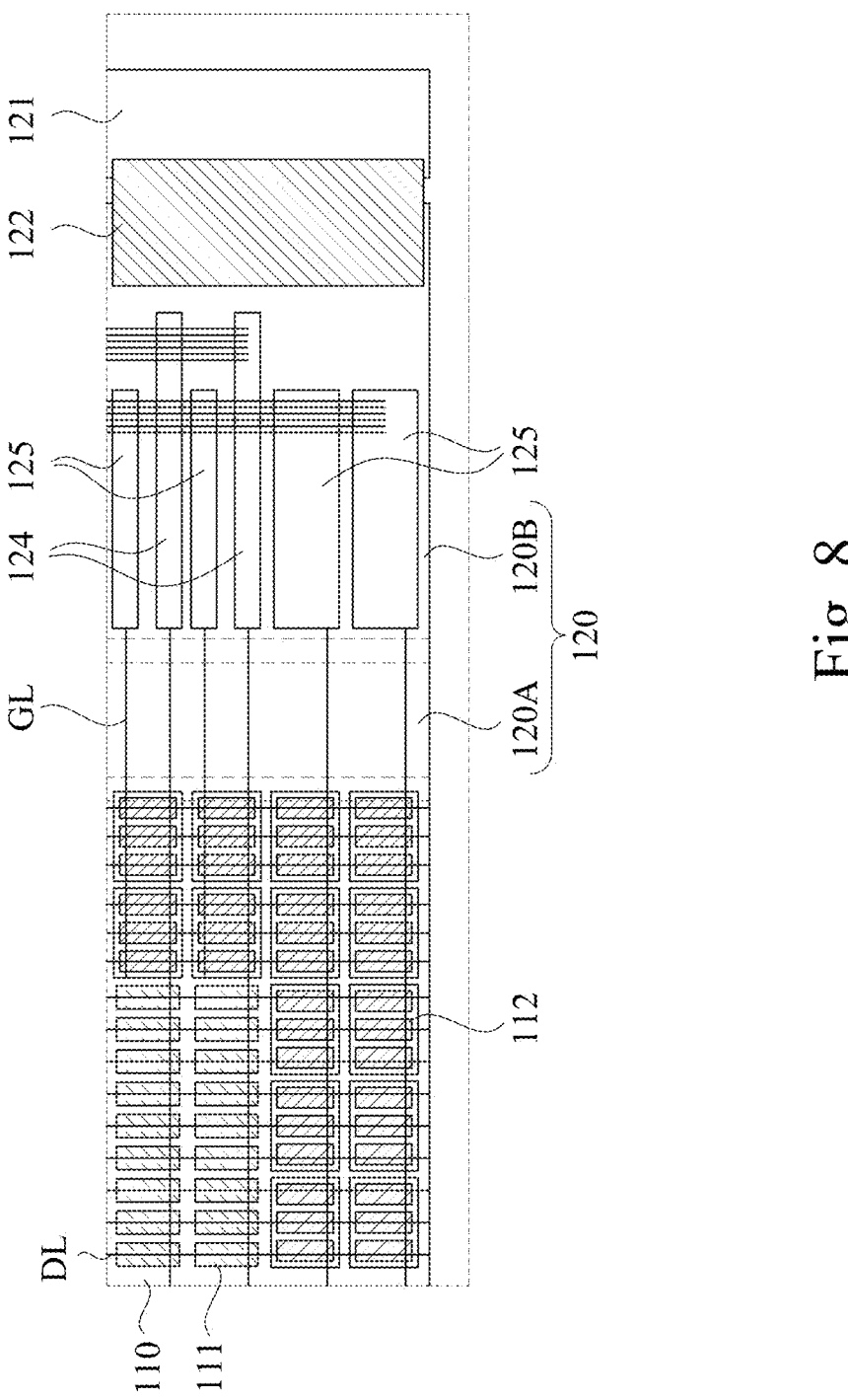

In accordance, the circuit configurations of the pixel units of the display device 20 are modified compared to the display device 10. Reference is made to FIG. 7 and FIG. 8. FIG. 7 and FIG. 8 are partial enlarged views of the display device 20 in a square 7 and a square 8 of FIG. 6, respectively. The second pixel units 112 collectively surround the first pixel units 111.

In addition, in the embodiments corresponding to the display device 20, a plurality of gate on arrays 124 and a plurality of gate on arrays 125 are arranged on the second bending portion 120B and are communicatively connected to the driving circuit board 121 through the flexible circuit boards 122. Each of the gate on arrays 124 is communicatively connected to the first pixel units 111 of a same column through a gate signal line GL. Each of the gate on arrays 125 is communicatively connected to the second pixel units 112 of a same column through another gate signal line GL. In other words, the gate driving signals of the first pixel units 111 and the gate driving signals of the second pixel units 112 are not shared.

On the other hand, in the embodiments corresponding to the display device 20, some of the first pixel units 111 and some of second pixel units 112 are communicatively connected to one of the chip on films 132 through a same data line DL. Meanwhile, some of the data lines DL are only communicatively connected to some of the second pixel units 112, not to the first pixel units 111. In other words, the source driving signals of the first pixel units 111 and the source driving signals of the second pixel units 112 are partially shared and partially not shared.

Figure 9:
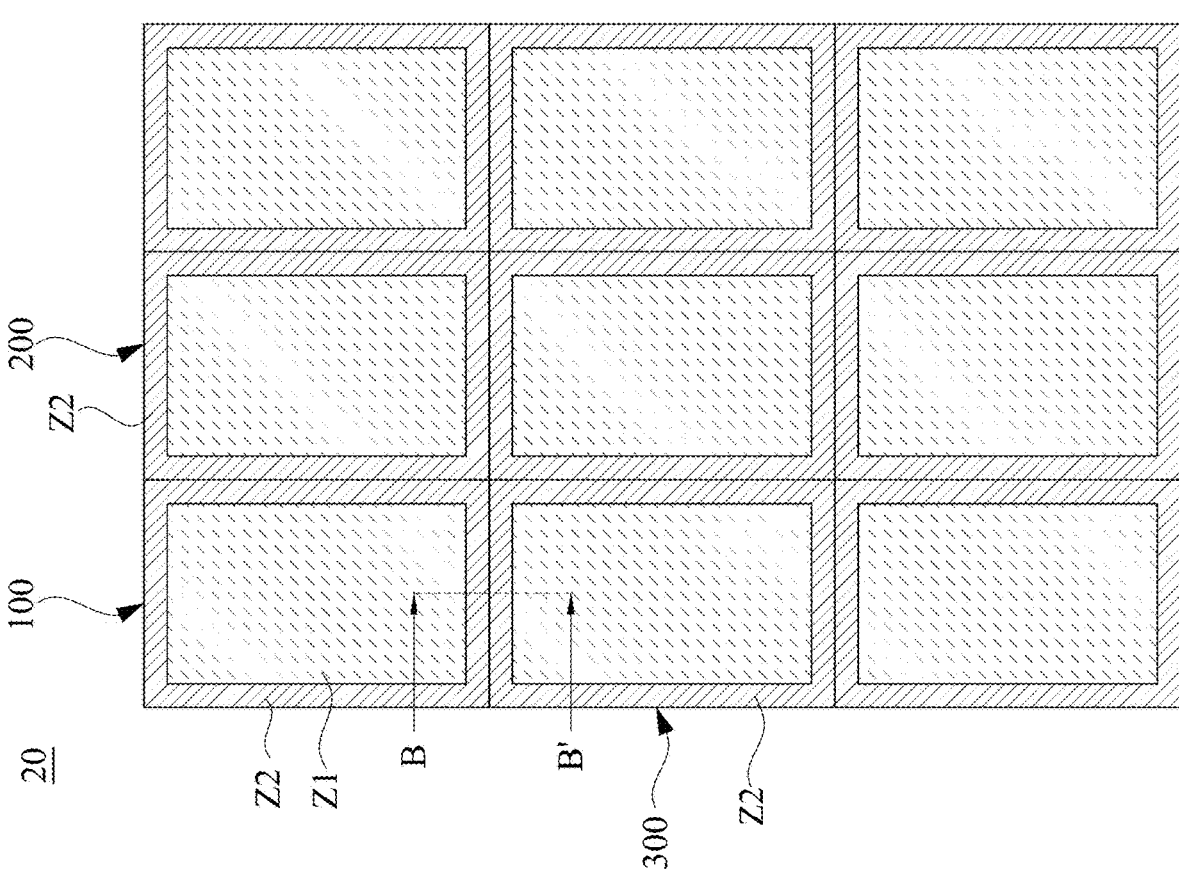
FIG. 9 is a schematic diagram of a display device according to some embodiments of the present disclosure.

Next, reference is made to FIG. 9. FIG. 9 is a schematic diagram of the display device 20 according to some embodiments of the present disclosure. In some embodiments, the display device 20 has multiple circuit substrates with similar structures adjacent to each other (e.g., the first circuit substrate 100, the second circuit substrate 200, and the third circuit substrate 300). Since the second pixel area Z2 of each of the circuit substrates of the display device 20 completely surrounds the first pixel area Z1, the display device 20 can achieve an N×N large-sized seamless display. For example, FIG. 9 illustrates a 3×3 seamless display.

Figure 10:
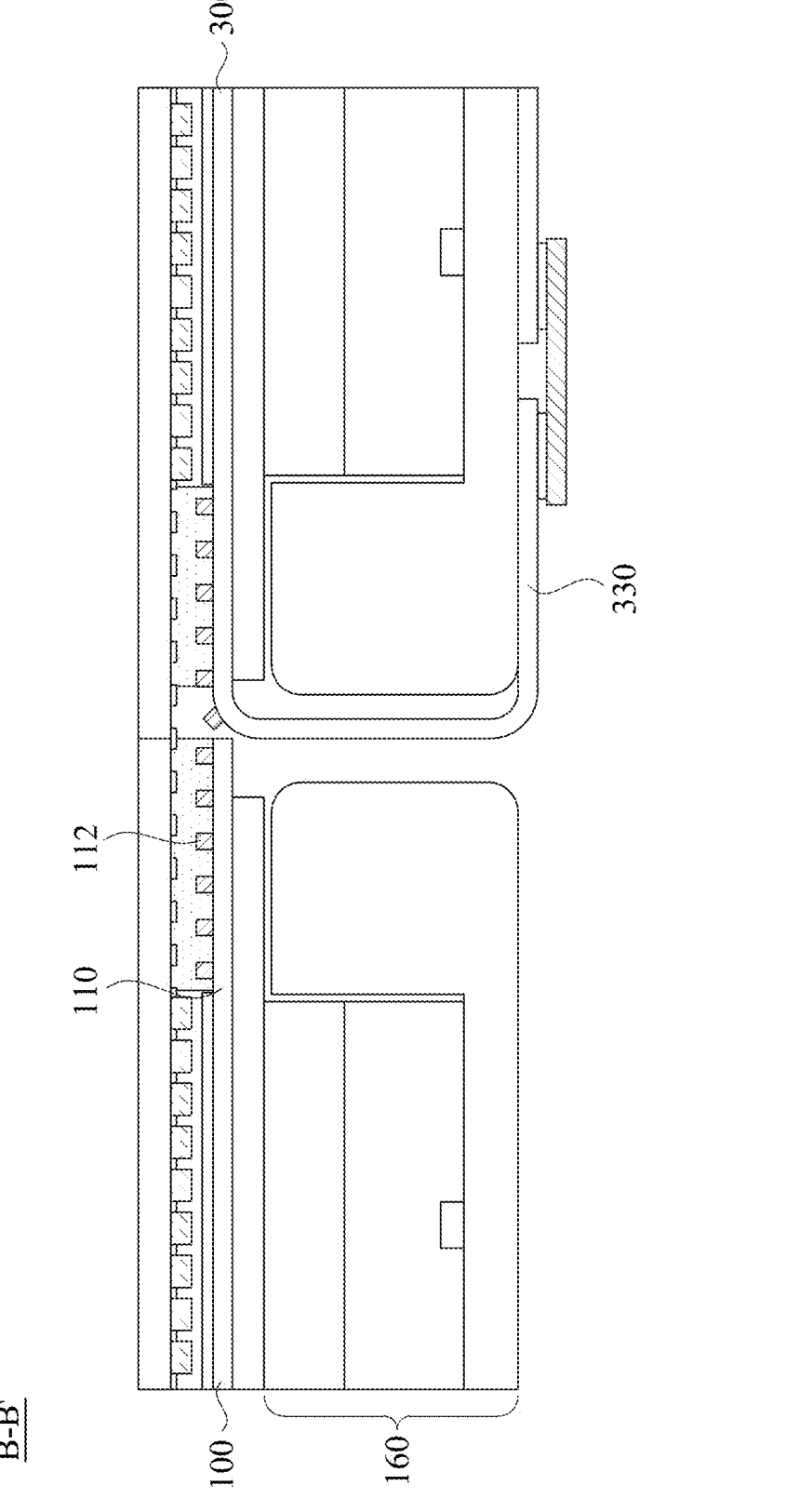
FIG. 10 is a partial cross-sectional view of a display device along a line B-B' of FIG. 9 according to some embodiments of the present disclosure.

Reference is made to FIG. 10. FIG. 10 is a partial cross-sectional view of the display device 20 along a line B-B' in FIG. 9. A side of the central portion 110 of the first circuit substrate 100 without an extending portion is directly adjacent to a second extending portion 330 of a third circuit substrate 300. Similarly, in some embodiments, depending on the shape and tiling method of the circuit substrates, the side of the central portion 110 of the first circuit substrate 100 without an extending portion can be directly adjacent to a first extending portion of the third circuit substrate 300.

Figure 11:
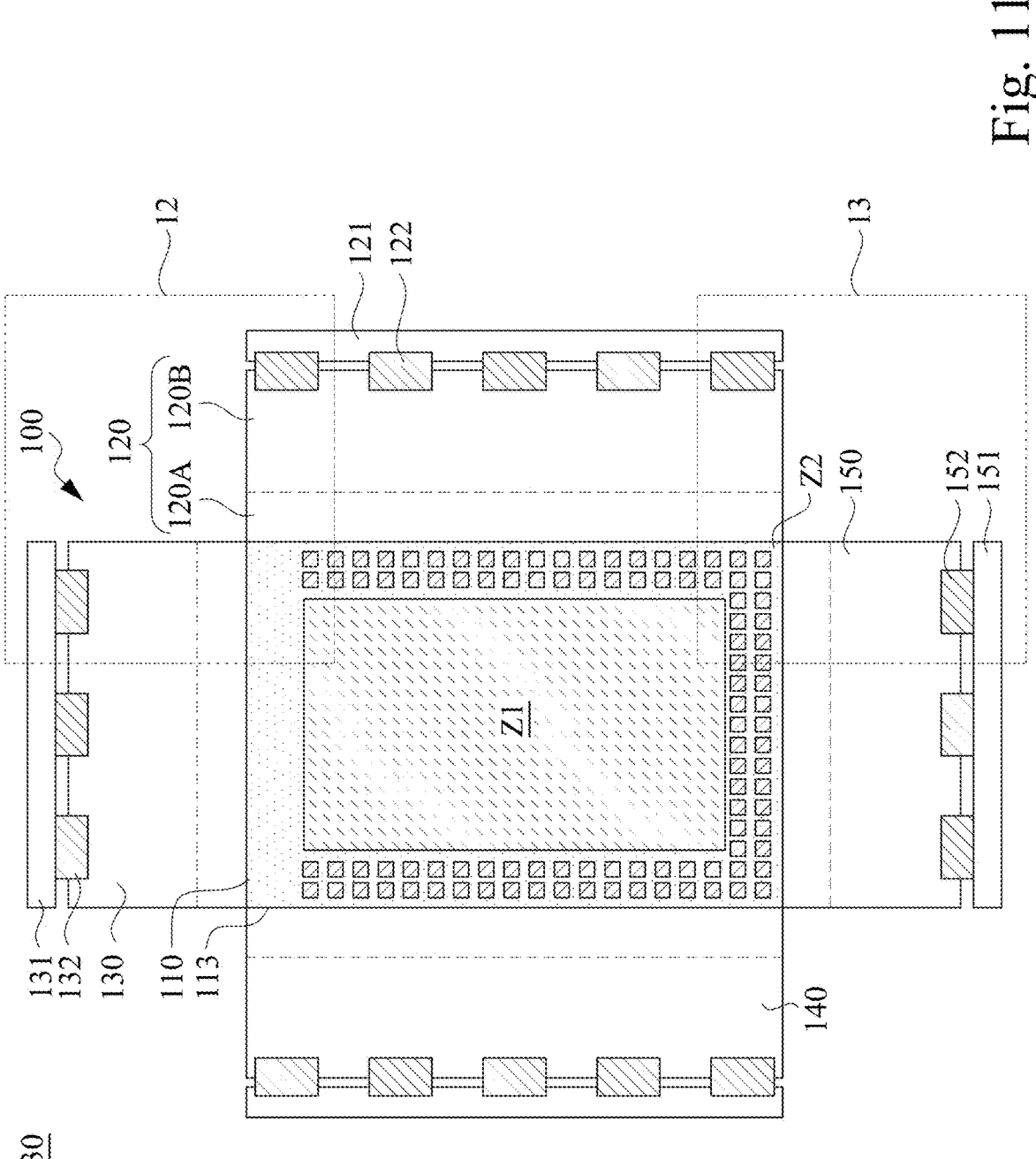
FIG. 11 is a schematic diagram of a display device according to some embodiments of the present disclosure.

Reference is made to FIG. 11. FIG. 11 is a schematic diagram of a display device 30 according to some embodiments of the present disclosure. One of the differences between the display device 30 and the display device 10 is that the display device 30 further includes a fourth extending portion 150 disposed on a side of the central portion 110 that is opposite to the second extending portion 130 (e.g., the lower side), and the second pixel area Z2 further extends between the first pixel area Z1 and the fourth extending portion 150. Similar to the second extending portion 130, the fourth extending portion 150 is adjacent to and connected to a driving circuit board 151 and is disposed with a plurality of chip on films 152.

Figure 12:
FIG. 12 and FIG. 13 are partial enlarged views of a display device in a square 12 and a square 13 of FIG. 11 according to some embodiments of the present disclosure.
Figure 13:

In accordance, the circuit configurations of the pixel units of the display device 30 are modified compared to the display device 10. Reference is made to FIG. 12 and FIG. 13. FIG. 12 and FIG. 13 are partial enlarged views of the display device 30 in a square 12 and a square 13 of FIG. 11, respectively. A plurality of gate on arrays 124 are disposed on the first bending portion 120A of the display device 30, and a plurality of gate on arrays 125 are disposed on the second bending portion 120B to provide the pixel unit gate driving signals. Each of the gate on arrays 124 is communicatively connected to the first pixel units 111 of a same column through a gate signal line GL. Each of the gate on arrays 125 is communicatively connected to the second pixel units 112 of a same column through another gate signal line GL. In other words, the gate driving signals of the first pixel units 111 and the gate driving signals of the second pixel units 112 are not shared. On the other hand, as shown in FIG. 13, a plurality of gate on arrays 126 may be disposed on the first extending portion 120 of the display device 30, extending from the second bending portion 120B to the first bending portion 120A, and communicatively connected to the second pixel units 112 of a same column through still another gate signal line GL. The gate on arrays 124, the gate on arrays 125, and the gate on arrays 126 are communicatively connected to the driving circuit board 121 through the flexible circuit boards 122.

As shown in FIG. 12 and FIG. 13, the first pixel units 111 of the display device 30 are communicatively connected to the chip on films 132 on the second extending portion 130 through the data lines DL extending toward the second extending portion 130. The second pixel units 112 between the first pixel units 111 and the fourth extending portion 150 are communicatively connected to the chip on films 152 on the fourth extending portion 150 through the data lines DL extending toward the fourth extending portion 150. In addition, the second pixel units 112 between the first pixel units 111 and the first extending portion 120 may be communicatively connected either to the chip on films 132 or to the chip on films 152 through the data lines DL extending toward the second extending portion 130 or toward the fourth extending portion 150, respectively. In other words, the source driving signals of the first pixel units 111 and the source driving signals of the second pixel units 112 of the display device 30 are not shared.

Figure 14:
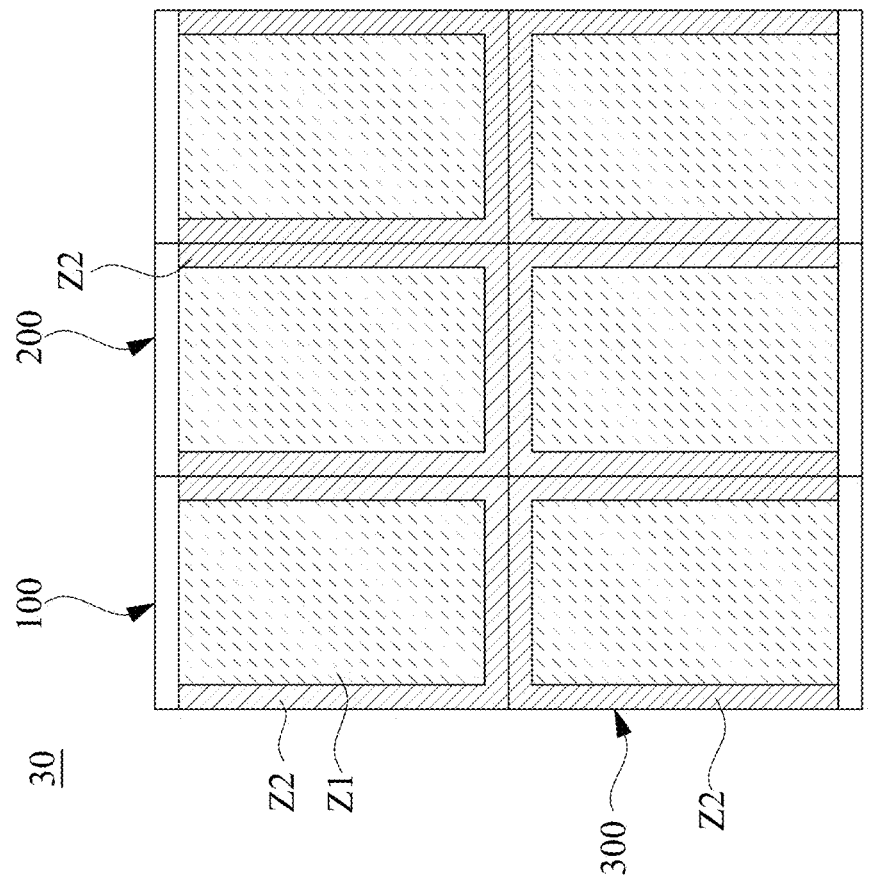
FIG. 14 is a schematic diagram of a display device according to some embodiments of the present disclosure.

Next, reference is made to FIG. 14. FIG. 14 is a schematic diagram of the display device 30 according to some embodiments of the present disclosure. In some embodiments, the display device 30 has multiple circuit substrates with similar structures adjacent to each other (e.g., the first circuit substrate 100, the second circuit substrate 200, and the third circuit substrate 300). Since the second pixel area Z2 of each of the circuit substrates of the display device 30 surrounds three sides of the first pixel area Z1, the display device 30 can achieve a 2×N large-sized seamless display. For example, FIG. 14 illustrates a 2×3 seamless display. To be more specific, the first extending portion of the first circuit substrate 100 is tiled adjacent to the third extending portion of the second circuit substrate 200, and the fourth extending portion of the first circuit substrate 100 is tiled adjacent to the fourth extending portion of the third circuit substrate 300. In this way, the second pixel areas Z2 of the circuit substrates can be adjacent to each other and achieve a seamless visual effect.

Figure 15:
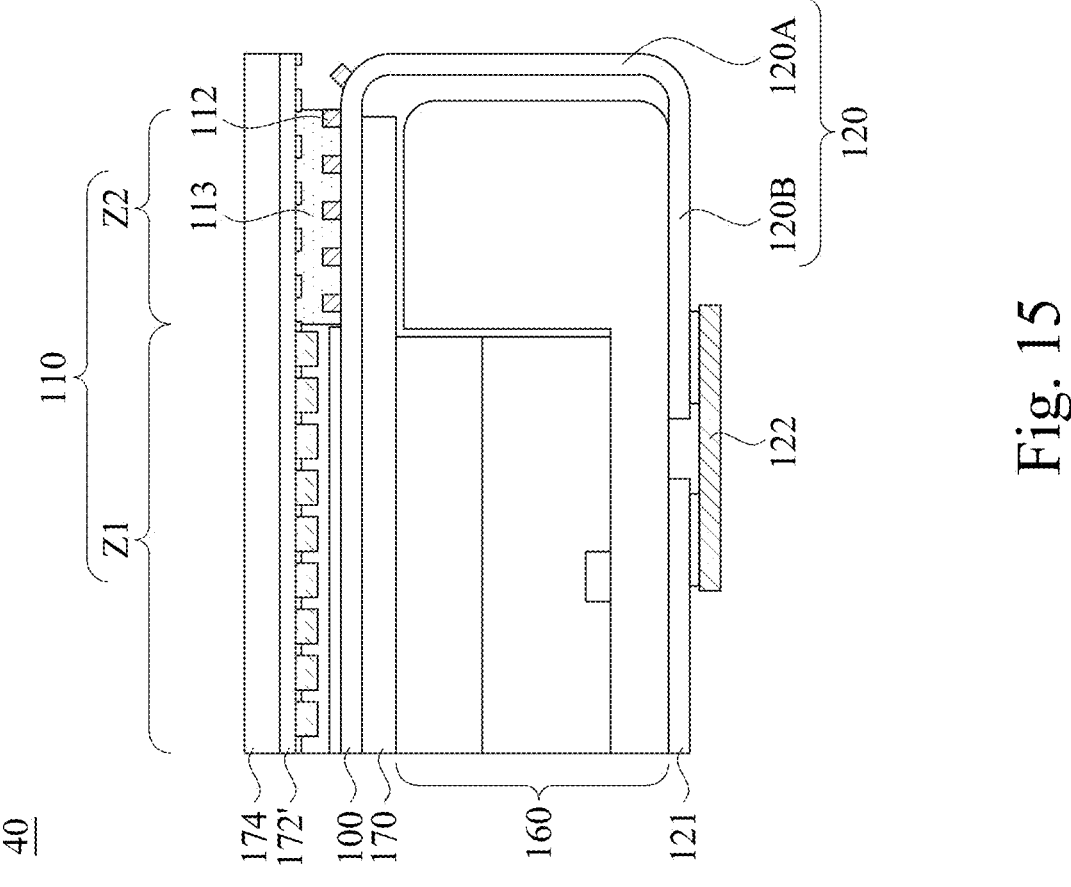
FIG. 15 is a partial cross-sectional view of a display device according to some other embodiments of the present disclosure.

Reference is made to FIG. 15. FIG. 15 is a partial cross-sectional view of a display device 40 according to some other embodiments of the present disclosure. The difference between the display device 40 and the display device 10 is that the color filter 172' of the display device 40 is a flexible color filter to reduce stress caused by bending. In such embodiments, the display device 40 may further include a glass cover 174 above the color filter 172'.

Figure 16:
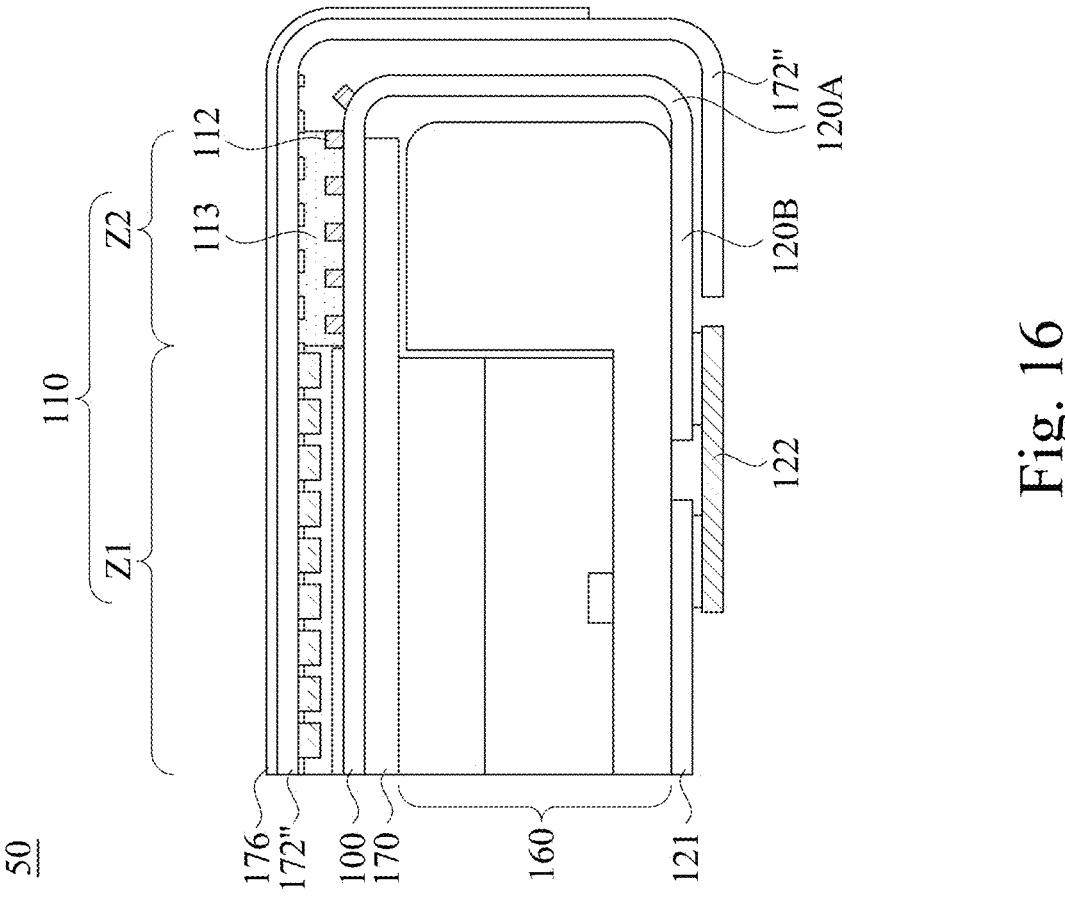
FIG. 16 is a partial cross-sectional view of a display device according to yet some other embodiments of the present disclosure.

Reference is made to FIG. 16. FIG. 16 is a partial cross-sectional view of a display device 50 according to yet some other embodiments of the present disclosure. The color filter 172" of the display device 50 is also a flexible color filter, and the color filter 172" further includes an extending portion extending to a side of the first extending portion 120 of the first circuit substrate 100 that is away from the backlight module 160 (e.g., the outer side and the lower side of the first extending portion 120 shown in FIG. 16). In such embodiments, the display device 50 may further include a polarizer 176 above the color filter 172" and bent accordingly. In this way, the error caused when adhering the polarizer 176 can be reduced.

It should be noted that in the display devices of some embodiments of the present disclosure, the circuit substrate may include only one extending portion. For example, the first circuit substrate 100 may include only the second extending portion 130. In such embodiments, the chip on films and the gate on arrays are disposed on the extending portion and communicatively connected to the driving circuit board. Similarly, the signal connections of the pixel area related to the source driving signals and the gate driving signals may be configured according to the distribution of the second pixel area.

According to the foregoing recitations of the embodiments of the disclosure, it may be seen that in the display device of some embodiments of the present disclosure, by disposing a bendable extending portion on the circuit substrate for tiling, the circuit for the pixel area can be bent to the side surface of the backlight module or below the backlight module, thereby increasing the wiring space for the pixel area. In addition, by disposing a second pixel area (e.g., a light-emitting diode pixel area) in the sealant layer around the first pixel area (e.g., a liquid crystal pixel area) of the circuit substrate, light-emitting units are disposed at the adjacencies between the circuit substrates tiled together, thereby eliminating the image discontinuity at the adjacencies. Moreover, with increased wiring space, a gate on array can be used to replace the traditional gate driver, and liquid crystal units and light-emitting diodes can thus be integrated on the same circuit substrate. In turn, large-sized seamless tiling display may be achieved while manufacturing costs are reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display device, comprising:
a backlight module;
a first circuit substrate being a single continuous substrate and having a central portion and a first extending portion, wherein the central portion has a first pixel area and a second pixel area above the backlight module, the first pixel area has a plurality of first pixel units, the second pixel area has a plurality of second pixel units, and the second pixel units collectively surround the first pixel units, wherein the first extending portion comprises:
a first bending portion connected to a first side of the central portion and configured to be bent to a side surface of the backlight module, wherein one of the second pixel units is at least partially on the first bending portion and is tilted relative to another one of the second pixel units disposed on the central portion, wherein the second pixel units are distributed from the second pixel area of the central portion to the first bending portion across a junction between the central portion and the first bending portion to define a continuous display surface; and
a second bending portion connected to the central portion through the first bending portion and configured to be bent below the backlight module, wherein the second bending portion has a first gate on array, wherein the first gate on array is communicatively connected to both the first pixel units and the second pixel units;
a sealant layer above the central portion of the first circuit substrate, wherein the sealant layer covers at least some of the second pixel units in the second pixel area, surrounds the first pixel area, and exposes the first pixel area; and
a color filter above the sealant layer, wherein the sealant layer interfaces with the first circuit substrate and the color filter.

2. The display device of claim 1, wherein the second pixel units of the second pixel area are at least partially between the first extending portion and the first pixel area.

3. The display device of claim 1, wherein the first pixel units and the second pixel units are electrically connected to the first circuit substrate.

4. The display device of claim 1, wherein the first gate on array extends from the second bending portion to the first bending portion.

5. The display device of claim 1, wherein some of the first pixel units and some of the second pixel units are communicatively connected to the first gate on array.

6. The display device of claim 1, wherein the first circuit substrate has a second gate on array on the first bending portion, wherein some of the first pixel units are communicatively connected to the second gate on array, and some of the second pixel units are communicatively connected to the first gate on array.

7. The display device of claim 1, wherein the first circuit substrate has a first chip on film, wherein some of the first pixel units and some of the second pixel units are communicatively connected to the first chip on film.

8. The display device of claim 7, wherein the first circuit substrate further has a second extending portion connected to a second side of the central portion that is different from the first side, and the first chip on film is on the second extending portion.

9. The display device of claim 1, wherein the first circuit substrate further has a first chip on film and a second chip on film, wherein some of the first pixel units are communicatively connected to the first chip on film, and some of the second pixel units are communicatively connected to the second chip on film.

10. The display device of claim 9, wherein the first circuit substrate further has a second extending portion connected to a second side of the central portion that is different from the first side, wherein the first chip on film and the second chip on film are on the second extending portion.

11. The display device of claim 9, wherein the first circuit substrate further has a second extending portion and a third extending portion connected to opposite sides of the central portion that are different from the first side, respectively, wherein the first chip on film is on the second extending portion, and the second chip on film is on the third extending portion.

12. The display device of claim 1, further comprising a second circuit substrate, wherein the second circuit substrate has a central portion and a first extending portion connected to a first side of the central portion of the second circuit substrate, wherein the first extending portion of the first circuit substrate is at a second side of the second circuit substrate that is different from the first side of the second circuit substrate, and the first extending portion of the first circuit substrate is adjacent to the central portion of the second circuit substrate.

13. The display device of claim 1, further comprising a glass substrate between the first circuit substrate and the backlight module.

14. The display device of claim 1, further comprising a polarizer extending from above the central portion of the first circuit substrate to a side of the first extending portion of the first circuit substrate that is away from the backlight module.

15. A display device, comprising:
a driving circuit board;
a backlight module above the driving circuit board; and
a first circuit substrate being a single continuous substrate and having a central portion and a first extending portion, wherein the central portion has a first pixel area and a second pixel area above the backlight module, the first pixel area has a plurality of first pixel units, the second pixel area has a plurality of second pixel units, and the second pixel units collectively surround the first pixel units, wherein the first extending portion comprises:
a first bending portion connected to the central portion and extending from the central portion to a side surface of the backlight module, wherein one of the second pixel units is at least partially on the first bending portion and is tilted relative to another one of the second pixel units disposed on the central portion, wherein the second pixel units are distributed from the second pixel area of the central portion to the first bending portion across a junction between the central portion and the first bending portion to define a continuous display surface; and
a second bending portion connected to the central portion through the first bending portion and extending from the first bending portion to the driving circuit board, wherein at least one of the first pixel units and the second pixel units is communicatively connected to the driving circuit board through the first extending portion;
a sealant layer above the central portion of the first circuit substrate, wherein the sealant layer covers some of the second pixel units in the second pixel area and exposes the first pixel area and the one of the second pixel units that is tilted; and
a color filter vertically above the sealant layer, the first pixel area, and the second pixel area.

16. The display device of claim 15, wherein the first circuit substrate further comprises a first gate on array and a flexible circuit board on the second bending portion, wherein the at least one of the first pixel units and the second pixel units is communicatively connected to the first gate on array, and the first gate on array is communicatively connected to the driving circuit board through the flexible circuit board.

17. The display device of claim 16, wherein some of the first pixel units and some of the second pixel units are communicatively connected to the first gate on array.

18. The display device of claim 16, wherein the first circuit substrate has a second gate on array on the first bending portion and communicatively connected to the driving circuit board through the flexible circuit board, wherein some of the first pixel units are communicatively connected to the second gate on array, and some of the second pixel units are communicatively connected to the first gate on array.

19. The display device of claim 15, wherein the first circuit substrate has a chip on film, wherein some of the first pixel units and some of the second pixel units are communicatively connected to the chip on film.

* * * * *